United States Patent
Kain (10) Patent No.: US 7,517,023 B2
(45) Date of Patent: Apr. 14, 2009

(54) JUVENILE SEAT ARMREST

(75) Inventor: James M. Kain, Troy, OH (US)

(73) Assignee: Cosco Management, Inc., Wilmington, DE (US)

(*) Notice: Subject to any disclaimer, the term of this patent is extended or adjusted under 35 U.S.C. 154(b) by 1743 days.

(21) Appl. No.: 09/871,199

(22) Filed: May 31, 2001

(65) Prior Publication Data

US 2002/0036418 A1    Mar. 28, 2002

Related U.S. Application Data

(60) Provisional application No. 60/234,543, filed on Sep. 22, 2000.

(51) Int. Cl.
   *A47C 3/12* (2006.01)
   *A47B 1/10* (2006.01)
(52) U.S. Cl. .............. 297/411.29; 297/250.1
(58) Field of Classification Search .......... 297/250.1, 297/411.2, 411.29; 248/118
   See application file for complete search history.

(56) References Cited

U.S. PATENT DOCUMENTS

| | | | | |
|---|---|---|---|---|
| 207,764 | A * | 9/1878 | Mitchell | 297/335 |
| 364,519 | A * | 6/1887 | Kauffman | 297/411.44 |
| 2,254,332 | A * | 9/1941 | Tibbetts | 297/250.1 |
| 2,536,326 | A * | 1/1951 | Thaden | 297/295 |
| 2,602,488 | A | 7/1952 | Conning | |
| 2,605,811 | A * | 8/1952 | Zoranovich | 297/253 |
| 2,792,054 | A * | 5/1957 | Muoio | 297/256 |
| D180,660 | S * | 7/1957 | Johnson | D6/373 |
| 2,974,718 | A * | 3/1961 | Lawrence et al. | 297/256 |
| 3,124,390 | A * | 3/1964 | Eames et al. | 297/452.19 |
| 3,279,848 | A * | 10/1966 | Walker | 297/256 |
| 3,297,358 | A * | 1/1967 | Coutts et al. | 297/118 |
| 3,542,427 | A * | 11/1970 | Herpel et al. | 297/411.32 |
| 3,891,267 | A * | 6/1975 | Taylor | 297/68 |
| 3,992,057 | A | 11/1976 | Studebaker | |
| 4,067,613 | A * | 1/1978 | Pesiri | 297/411.29 |
| 4,076,307 | A * | 2/1978 | Nanba et al. | 297/256.15 |
| 4,099,780 | A | 7/1978 | Schmidhuber | |
| D254,889 | S * | 5/1980 | Marrujo | D6/495 |
| 4,274,674 | A * | 6/1981 | Deloustal | 297/256.13 |
| 4,366,980 | A * | 1/1983 | Rowland | 297/239 |

(Continued)

FOREIGN PATENT DOCUMENTS

GB    2350292 A    * 11/2000

(Continued)

OTHER PUBLICATIONS

"Ascend SE" car seat manufactured by Century Products, Graco Children's Products Inc; Jul. 17, 2000; See Attached Photographs 1-7.

*Primary Examiner*—Joseph F Edell
(74) *Attorney, Agent, or Firm*—Barnes & Thornburg LLP (57) ABSTRACT

A pair of cantilevered armrests are mounted on a juvenile seat. Each armrest includes an arm and a support mount appended to the arm and coupled to the seat back. The support mount extends above and below the arm to embrace the seat back. One fastener lies above the arm and is coupled to an upper portion of the support mount. Another fastener lies below the arm and is coupled to a lower portion of the support mount.

21 Claims, 5 Drawing Sheets

U.S. PATENT DOCUMENTS

| | | |
|---|---|---|
| 4,660,237 A | 4/1987 | Brodnax |
| 4,768,797 A | 9/1988 | Friedrich |
| 4,874,203 A | 10/1989 | Henley |
| 5,056,868 A | 10/1991 | Beck |
| 5,088,791 A | 2/1992 | Conley et al. |
| 5,290,092 A | 3/1994 | Geer |
| 5,294,182 A * | 3/1994 | Colasanti .................... 297/467 |
| 5,297,851 A * | 3/1994 | Van Hekken ........... 297/452.14 |
| 5,316,373 A * | 5/1994 | Markel .................. 297/411.32 |
| 5,366,271 A | 11/1994 | Johnston et al. |
| 5,366,276 A | 11/1994 | Hobson et al. |
| D359,177 S * | 6/1995 | Bartlmae ..................... D6/380 |
| 5,526,537 A * | 6/1996 | Conrad ......................... 4/483 |
| 5,609,389 A | 3/1997 | Longoria et al. |
| 5,669,663 A | 9/1997 | Feuerherdt |
| 5,810,445 A | 9/1998 | Surot |
| 6,070,937 A * | 6/2000 | Ginat ......................... 297/285 |
| 6,478,372 B1 * | 11/2002 | Lemmeyer et al. ..... 297/188.18 |

FOREIGN PATENT DOCUMENTS

| | | |
|---|---|---|
| WO | WO-8103115 A1 * | 11/1981 |

* cited by examiner

JUVENILE SEAT ARMREST

This application claims priority under 35 U.S.C. 119(e) to U.S. Provisional Application Ser. No. 60/234,543, filed Sep. 22, 2000, which is expressly incorporated by reference herein.

BACKGROUND AND SUMMARY OF THE INVENTION

The present invention relates to armrests, and particularly, to armrests used with juvenile seats. More particularly, the present invention relates to cantilevered armrests for use with juvenile vehicle seats.

Armrests are frequently used on various chairs for children as well as adults, to provide support for the arms. Armrests also can provide greater comfort when one is seated for long periods. When children travel, discomfort can lead to restlessness. Armrests connected to juvenile vehicle seats provide support for a child's arms, so that the child may be seated more comfortably during travel.

According to the present disclosure, a juvenile vehicle seat assembly includes a seat and a cantilevered armrest projecting from a seat back included in the seat. The cantilevered armrest includes an arm and a support mount appended to the arm and coupled to the seat back to support the arm in a cantilevered position. A first fastener is coupled to the seat back and the support mount at a location above the arm to fix the cantilevered armrest to the seat back.

In preferred embodiments, the support mount is formed to include a rearwardly facing U-shaped channel sized and shaped to receive a forwardly facing side edge of the seat back therein. A second fastener is coupled to the seat back and support mount at a location below the arm and below the first fastener. A load support panel is provided in the cantilevered armrest and arranged to engage the forwardly facing side edge of the seat back to block movement of the catilevered armrest about a pivot axis established by the first fastener.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
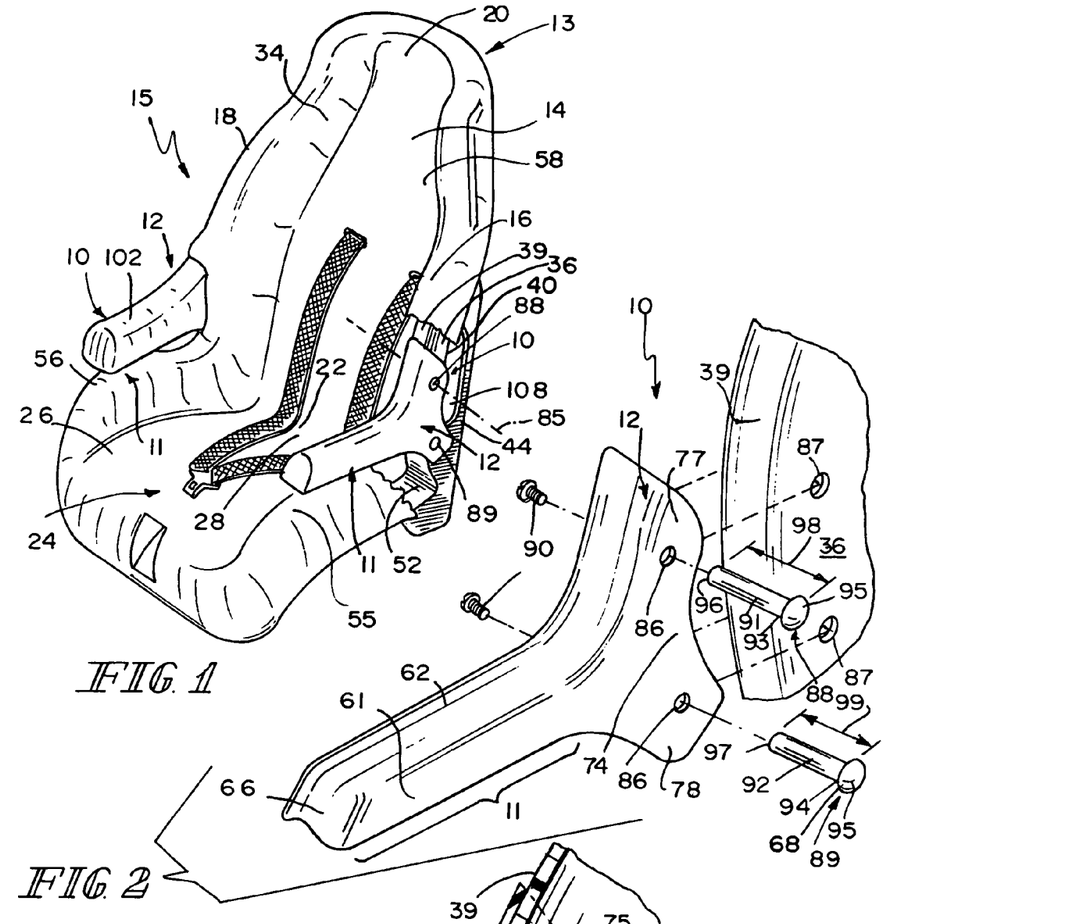
FIG. 1 is a perspective view of a juvenile vehicle seat showing a pair of cantilevered armrests and showing a fabric-cover right armrest and an uncovered monolithic left armrest.
FIG. 2 is an enlarged perspective view of the left cantilevered armrest of FIG. 1 showing that the monolithic armrest includes an arm and a support mount configured to receive two fasteners.
Figure 3:
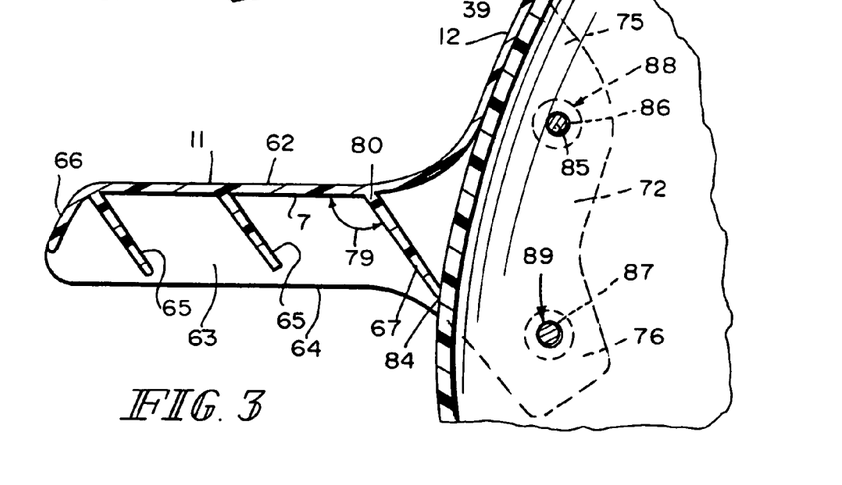
FIG. 3 is a sectional view of the left cantilevered armrest of FIG. 1 showing the support mount of the cantilevered armrest coupled to a side edge of the seat back of the juvenile vehicle seat, a first fastener above the arm, a second fastener below the arm, and an angled load support panel positioned to lie inside the armrest and in contact with a forwardly-facing surface of the side edge of the seat back.

A juvenile seat assembly 15 includes a juvenile seat 13 and a pair of cantilevered armrests 10 as shown in FIGS. 1-3. Each cantilevered armrest 10 is monolithic as shown, for example, in FIGS. 2, 3, and 5 and projects away from a seat back 14 included in juvenile seat 13 as shown in FIG. 1. Each cantilevered armrest 10 includes an arm 11 and a support mount 12 appended to arm 11 and coupled to seat back 14 to support arm 11 in a cantilevered position above a seat bottom 24 included in juvenile seat 13. Arm 11 provides an area to support a forearm of an occupant, such as a child, while support mount 12 couples armrest 10 to juvenile seat 13. A first fastener 88 is coupled to seat back 14 and support mount 12 at a location above arm 11 to couple each monolithic cantilevered armrest 10 to seat back 14 as shown in FIGS. 1-3 and 8.

Support mount 12 is formed to include a rearwardly facing U-shaped channel 70 sized and shaped to receive a forwardly-facing side edge 16 of seat back 14 of juvenile seat 13, as illustrated, for example, in FIGS. 2-5 and 8. A second fastener 89 is coupled to seat back 14 and support mount 12 at a location below arm 11 and below first fastener 88 as shown in FIGS. 1-3. A load support panel 67 is provided in cantilevered armrest 10 and arranged to abut forwardly-facing side edge 16 of seat back 14 to block movement of cantilevered armrest 10 about a pivot axis 85 established by first fastener 88 as shown best in FIGS. 1 and 3.

A pair of cantilevered armrests 10 project from juvenile seat 13, arm rests 10 being adapted to firmly couple to juvenile seat 13, as shown in FIGS. 1-4. Juvenile seat 13 may be any juvenile seat, but preferably is a juvenile vehicle seat used to hold a child in a vehicle. A portion of seat cover 58 is moved away from, as suggested in FIG. 1, left side ridge 16 of seat back 14 and support mount 12 is positioned to lie against at least a portion of left side ridge 16.

Figure 7:
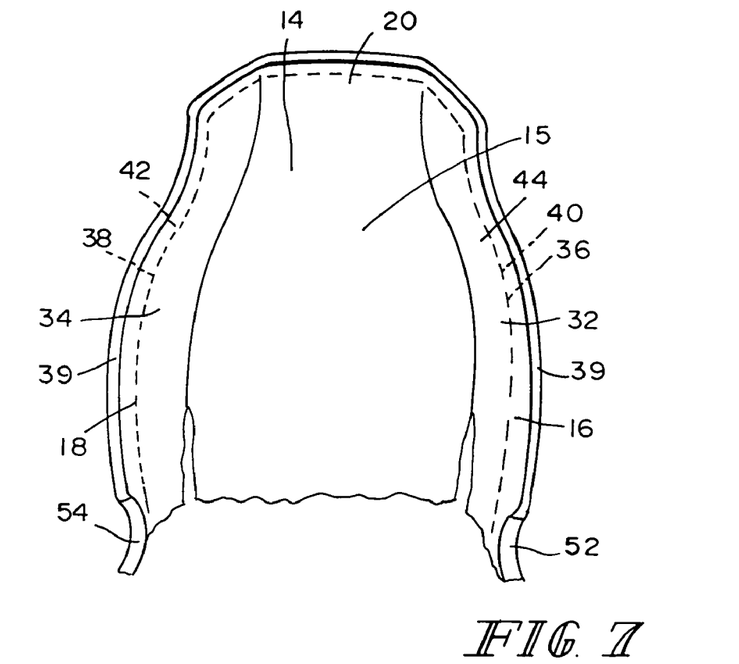
FIG. 7 is a partial front elevation view of the juvenile vehicle seat of FIG. 1, but showing the juvenile vehicle seat without the seat cover to illustrate the seat back and forwardly-facing left and right side edges that are adapted to be received in the U-shaped channels formed in the support mounts of the cantilevered armrests as suggested, for example, in FIGS. 3, 4, and 5.

Referring now to FIGS. 1 and 7, juvenile seat 13 includes a seat back 14 which includes a backrest 17, a left side edge or ridge 16 located alongside one side of backrest 17, and a right side edge or ridge 18 located alongside another side of backrest 17. Left side ridge 16 is positioned to lie in a spaced-apart relation relative to right side ridge 18, and backrest 17 of seat back 14 is positioned to lie between left and right side ridges 16, 18. Seat back 14 also has an upper end 20 and a lower end 22. Seat bottom 24 has a front side 26 and a back side 28, and back side 28 is positioned to lie against a portion of lower end 22 of seat back 14.

Left and right side ridges 16,18 illustrated in FIGS. 1, 2, and 7 of seat back 14 include a pair of inner panels 32, 34 and a pair of outer panels 36, 38. Inner panels 32, 34 are connected to outer panels 36, 38 at a rounded apex 39. Inner panels 32, 34 are positioned to lie in a spaced-apart relation relative to outer panels 36, 38.

Outer panels 36, 38 include an outer edge 40, 42, as shown in FIG. 7. The junction of inner panels 32, 34 and outer panels 36, 38 at rounded apex 39 form left and right side ridges 16, 18 as illustrated, for example, in FIGS. 4 and 7-8, of seat back 14 on an outside surface 44 of the juvenile seat 12. Left and right side ridges 16, 18 form a pair of recesses forming seatbelt notches 52, 54.

Juvenile seat 13 also includes left and right raised seat ridges 55, 56, which are positioned to lie in a spaced apart relation relative to one another, as shown in FIG. 1. Seat bottom 24 is positioned to lie between left and right raised seat ridges 55 and 56. Juvenile seat assembly 15 also includes a seat cover 58, which includes a pad that extends over seat back 14, left and right side ridges 16, 18, seat bottom 24, and left and right raised seat ridges 55, 56.

Figure 5:
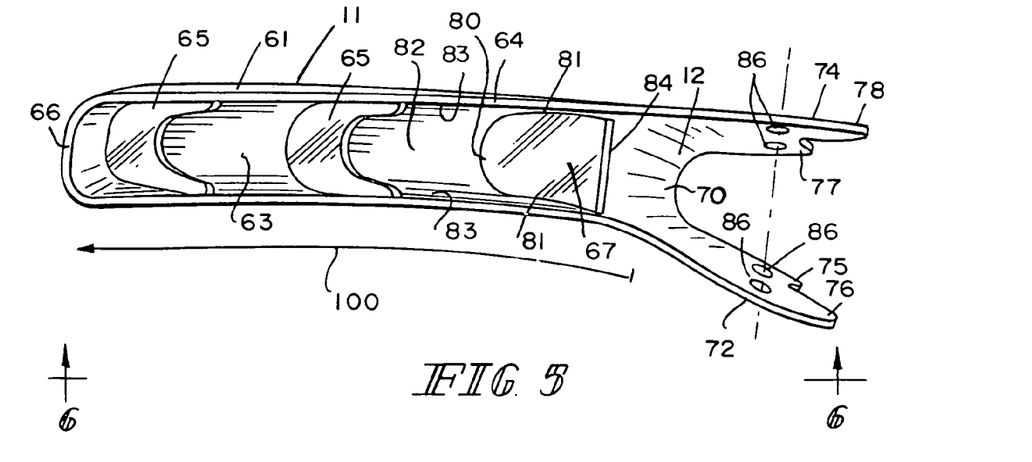
FIG. 5 is a bottom plan view of a left cantilevered armrest after it has been uncoupled from the seat back showing the formation of a somewhat "U-shaped" channel sized to receive a side edge of the seat back therein and showing the shape and location of the angled load support panel mounted inside the armrest and adjacent to the U-shaped channel.
Figure 6:
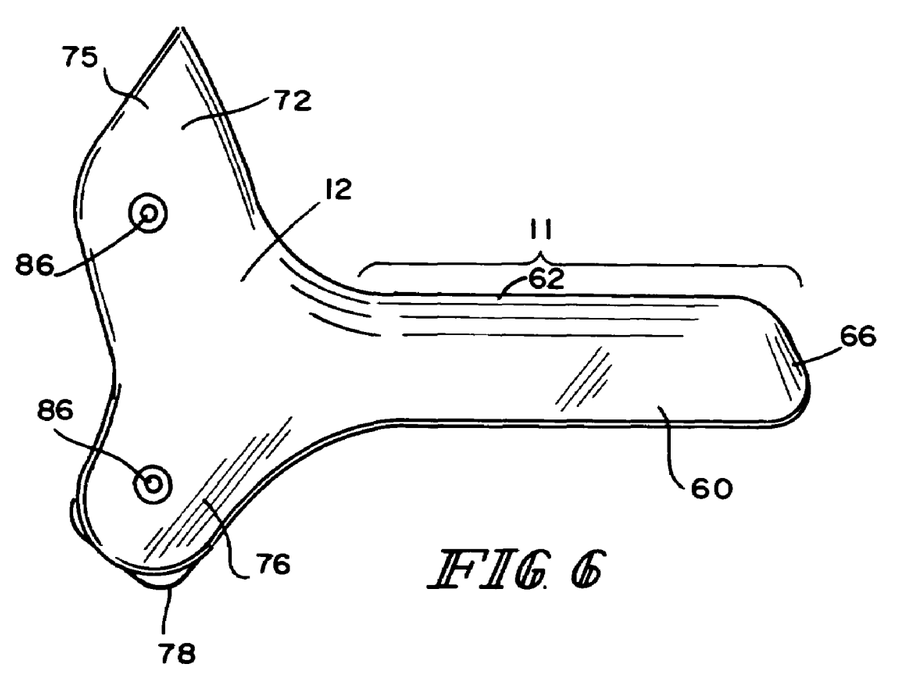
FIG. 6 is a side elevation view of the left cantilevered armrest of FIGS. 1 and 2 taken along line 6-6 of FIG. 5.

Each cantilevered armrest 10 has a pair of Y-shaped side walls as suggested in FIGS. 5 and 6. Arm 11 includes an inner side 60, an outer side 61, a top surface 62, and an open lower side 63 having a lower edge 64. Open lower side 63 has a least two inner panels 65 providing support for open lower side. Arm 11 includes free end 66 and, at an opposite end, a load support panel 67. Top surface 62 of arm 11 is adapted to support the forearm of a child occupant (not shown) of the juvenile seat 13.

Support mount 12 of each cantilevered armrest 10 is coupled to seat back 14 by two fasteners 88, 89 which cooperate to form a retainer. Support mount 12 is formed to include a rearwardly-facing open channel 70 which extends above the arm 11 and has a U-shape as shown in FIG. 5 or other suitable shape. Support mount 12 is also formed to include inner and outer flange 72, 74 which are coupled to arm 11. Outer flange 74 is positioned to lie in a spaced-apart relation to inner flange 72 to receive left or right side ridge 16, 18 of seat back 14 in open U-shaped channel 70.

Inner flange 72 includes upper wing 75 and lower wing 76. Outer flange 74 also includes upper wing 77 and lower wing 78. Upper wing 75 of inner flange 72 and upper wing 77 of outer flange 74 are positioned to lie in a spaced-apart relation to one another and are positioned to rise above arm 11 and away from seat bottom 24. Similarly, lower wing 76 of inner flange 72 and lower wing 78 of outer flange 74 are also positioned to lie in a spaced-apart relation to one another and extend below arm 11 and toward seat bottom 24.

Figure 4:
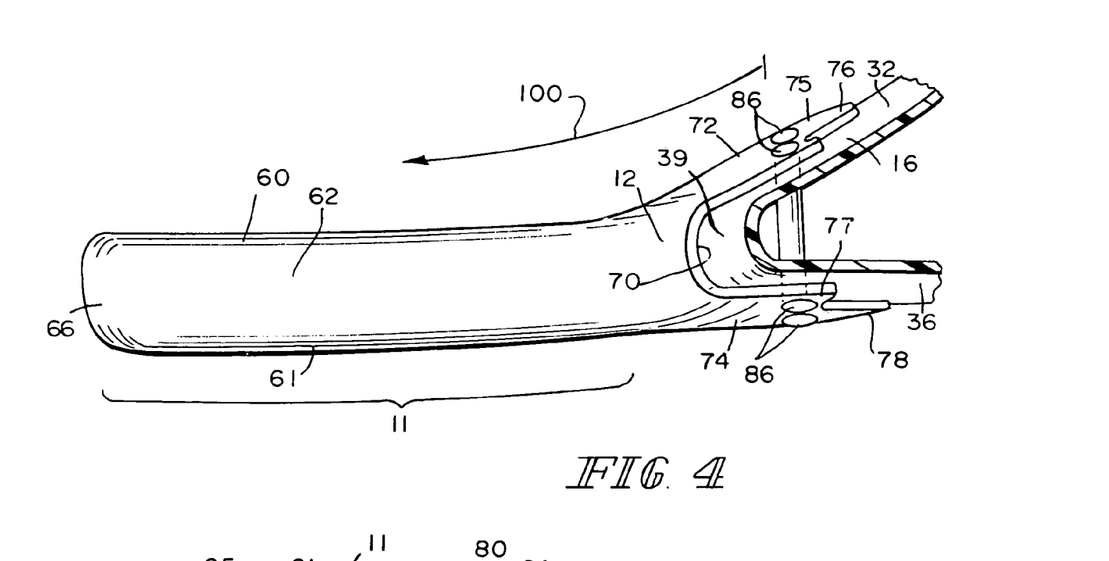
FIG. 4 is a top plan view of the left cantilevered armrest of FIG. 1.

Referring to FIG. 6, inner flange 72 is configured to conform generally to contours of inner panels 32, 34 of seat back 14. Outer flange 74, as illustrated in FIGS. 2 and 6, is similarly configured to conform generally to contours of outer panels 36, 38 of seat back 14. Rearwardly-facing open U-shaped channel 70 of support mount 12 is adapted to receive and conform to contours of forwardly-facing side edges 16, 18 of seat back 14 above arm 11, and particularly contours of rounded apex 39, as shown in FIGS. 3 and 4. Inner flange 72 is positioned to lie at an angle relative to outer flange 74 such that cantilevered armrests 10 are positioned to lie in a general vertical alignment with raised seat ridges 55, 56, as illustrated in FIGS. 1, 4, and 5. As such, cantilevered armrests 10 are not identical, right cantilevered armrest being a mirror image of left cantilevered armrest.

Open U-shaped channel 70 of support mount 12, as shown in FIGS. 3-5, is formed to extend above arm 11 and is positioned to lie against, for example, left side ridge 16, and particularly against rounded apex 39 of left side ridge 16. At the level of arm 11, load support panel 67 is positioned to lie against left side ridge 16, against rounded apex 39.

Load support panel 67 is positioned to lie at a junction of open lower side 63 of arm 11 and support mount 12 and is arranged to lie in a fixed position relative to arm 11 and support mount 12. As shown best in FIG. 3, load support panel 67 is formed to lie at an obtuse angle 79 relative to a downwardly facing wall 7 of arm 11, and has an upper end 80, and side walls 81. Upper end 80 abuts upper wall 82 of open lower side 63 and side walls 81 abut a portion of side walls 83 of open lower side 63. Side walls 81 of load support panel 67 also connect to a portion of inner and outer flanges 72, 74, due to the angle in which load support panel 67 is positioned. Load support panel 67 includes a lower edge 84 positioned to abut left or right side ridges 16, 18.

When support mount 12 is positioned against, for example only, left side ridge 16, lower edge 84 of load support panel 67 abuts rounded apex 39 of forwardly-facing left side ridge 16 of seat back 14 to block pivotable movement of cantilevered armrest 10 toward seat bottom 24 about a pivot axis 85, as illustrated in FIG. 3, established by first fastener 88. Lower edge 84 is positioned to both abut left side ridge 16 of seat back 14 and lie in a position between inner and outer flanges 72, 74 of support mount 12.

Fastener apertures 86, as shown in FIGS. 2, 3, 6, and 8 are formed in both upper wings 75, 77 and lower wings 76, 78 of inner and outer flanges 72, 74 of support mount 12. Similarly, openings 87 are formed in inner panels 32, 34 (not shown) and outer panels 36, 38 (only opening 87 in outer panel 36 shown) of left and right side ridges 16, 18 so that cantilevered armrests 10 can be coupled to left and right side ridges 16, 18 of seat back 14. Fastener apertures 86 are sized to receive fasteners. Fasteners includes a first fastener 88 and a second fastener 89, such as, for example, barrels 91, 92 secured by threaded screws or other suitable fastener.

Figure 8:
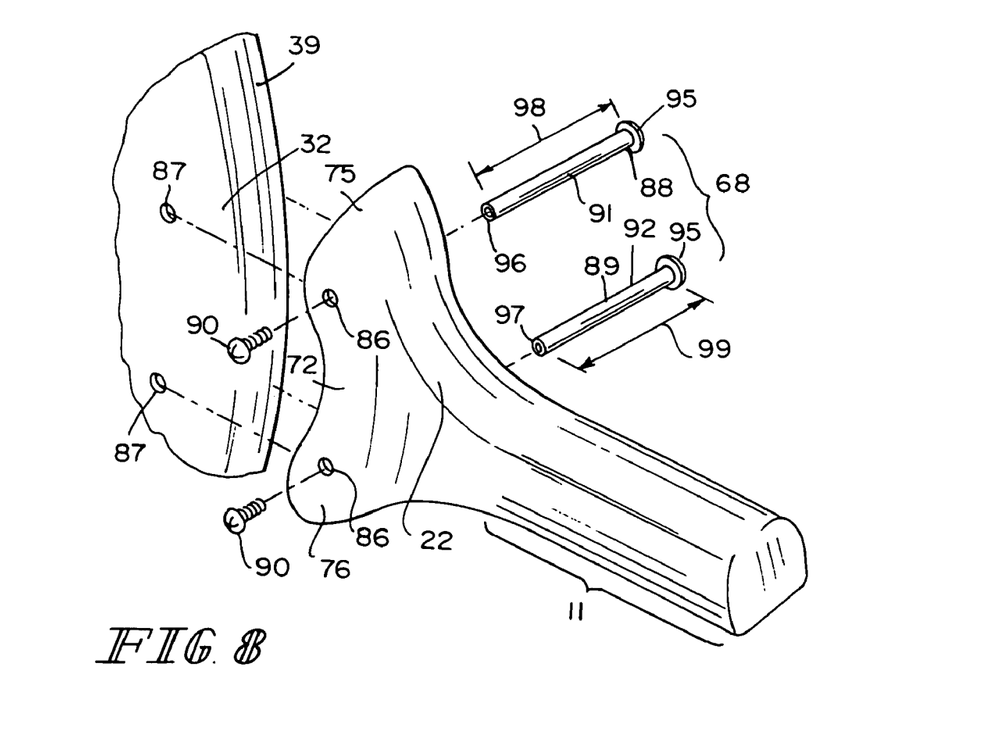
FIG. 8 is an enlarged perspective view of the left cantilevered armrest of FIG. 1 showing that the rearwardly-facing support mount is configured to be received in the forwardly-facing side edge and secured by two fasteners.

Each of the first and second fasteners 88, 89 having an elongated barrel 91, 92 having a first end 93, 94 having an enlarged head 95 coupled thereto, as illustrated in, for example, FIGS. 2 and 8. Each of the first and second fasteners 88, 89 have opposite open threaded ends 96, 97 as shown in FIG. 8. Threaded screws 90 fit in and mate with open threaded ends 96, 97 to securely couple first and second fasteners 88, 89 and therefore cantilevered arm rest 10 to seat back 14. First fastener 88 has a length 98. Second fastener 89 has a length 99 that is longer than the length 98 of the first fastener 88 as shown, for example, in FIGS. 2 and 8. First fastener 88 and second fastener 89 together form a retainer for retaining each cantilevered armrest 10 coupled to seat back 14.

First fastener 88 is coupled to at least a portion of support mount 12 and seat back 14 above arm 11 to maintain the arm 12 in the cantilevered position. Openings 87 in inner and outer panels 32, 36 of, for example, left side ridge 16 are aligned with fastener apertures 86, as shown in FIGS. 2 and 3. First fastener 88 is positioned to lie in fastener aperture 86 in both upper wings 75, 77 of inner and outer flanges 72, 74 of support mount 12, and through openings 87 in, for example only, inner and outer panels 32, 36 of left side ridge 16 of seat back 14. First fastener 88 is arranged to lie above arm 11 to cause arm 11 to lie between the first fastener 88 and the seat bottom 24. When first fastener is positioned, threaded screw 90 is positioned in open threaded end 96 of first fastener 88 to couple cantilevered arm rest 10 to left side ridge 16 of seat back 14.

In a similar manner, second fastener 89 is positioned to lie through fastener apertures 86 in both lower wings 76, 78 of inner and outer flanges 72, 74 of support mount 12, and through openings 87 in, for example only, inner and outer panels 32, 36 of left side ridge 16 of seat back 14 to firmly couple lower wings 76, 78 of cantilevered armrest 10 to left side ridge 16. Second fastener 89 is fastened with threaded screw 90 positioned in open threaded end 97 of second fastener 89. Second fastener 89 is positioned to lie below the lower edge 64 of the arm 11 and above the seat bottom 24. Second fastener 89, when coupled to support mount 12 and seat back 14, is arranged to lie between first fastener 88 and seat bottom 24.

Each cantilevered armrest 10 has a curve 100, as shown in FIGS. 4 and 5, which permits each armrest 10 to curve inward relative to the juvenile seat 13. Curve 100 acts with angle of inner flange 72 relative to outer flange 74 to permit arm 11 of cantilevered armrests 10 to align generally vertically over left and right flanks 55, 56, as illustrated in FIG. 1.

Figure 9:
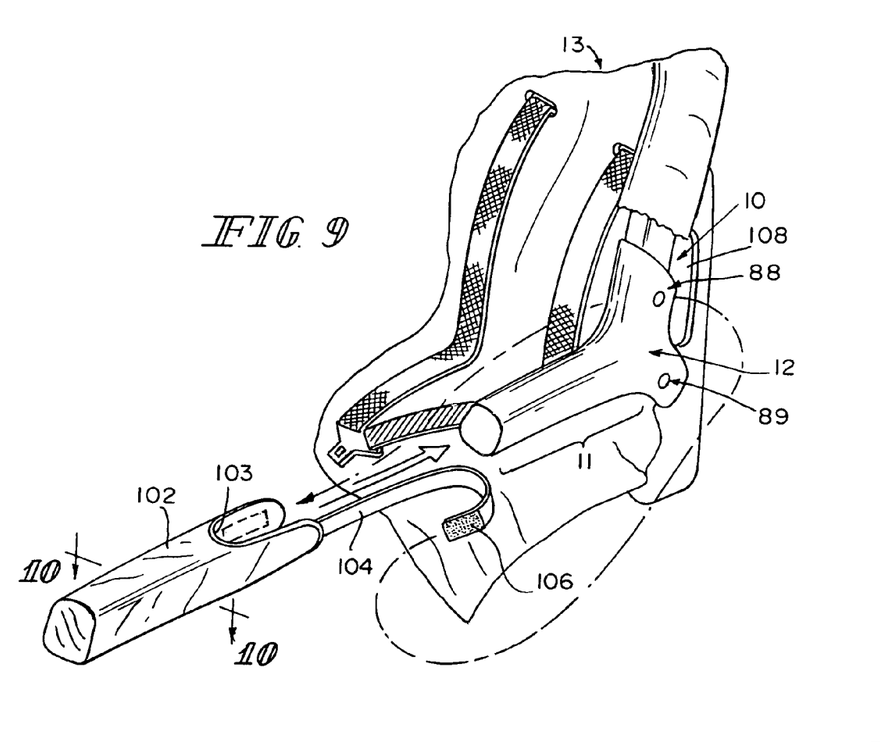
FIG. 9 is a perspective view of a portion of the left side of the juvenile vehicle seat of FIG. 1 showing an arm cover as it is about to be slipped onto an uncovered arm of the left cantilevered armrest.
Figure 10:
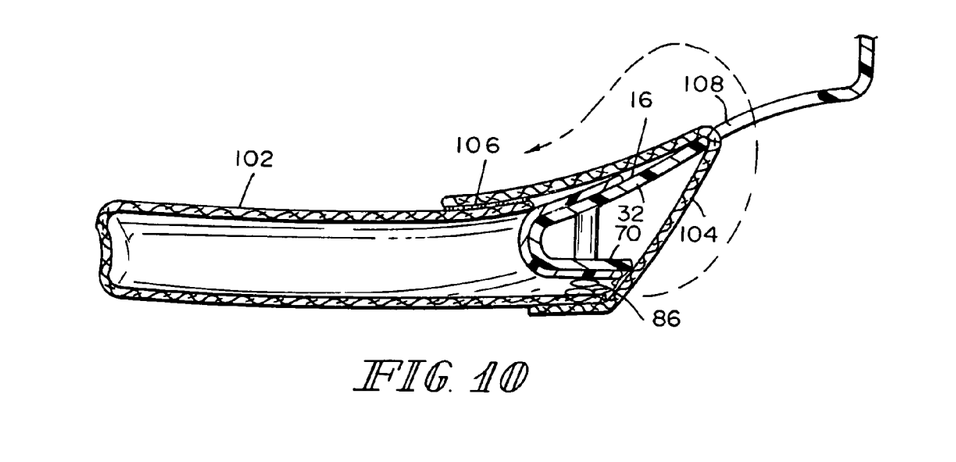
FIG. 10 is a sectional view of the left cantilevered armrest and arm cover taken along line 10-10 of FIG. 9 after the arm cover is slipped onto the arm and coupled to the seat back by passing a strap (shown in FIG. 9) through an aperture formed in the seat back and coupling a free end of the strap to the arm cover by means of, for example, a hook-and-loop fastener.

Cantilevered armrests 10 also have an arm cover 102 having an open end 103, and having a strap 104 with a strap fastener 106 positioned to lie thereon, as shown in FIGS. 1, 9 and 10. Arm cover 102 extends substantially over arm 11 and a portion of support mount 12, and has elongated strap 104 having strap fastener 106 which, for example, has a hook/loop material or other suitable article forming strap fastener 106, a reciprocal hook/loop material (not shown) or other suitable article positioned on the arm cover 102. Strap 104 extends through aperture 108 in juvenile vehicle seat 13 and connects to arm cover 104 via hook/loop material of strap fastener 106.

Arm cover 102 is positioned over arm 11 of each cantilevered armrest 10 by positioning open end 103 over free end 66 of arm 11 and sliding arm cover 102 into position over arm 11. Strap 104 is positioned to lie through aperture 108 in juvenile seat 13 as shown in FIGS. 9 and 10. Strap fastener 106 connects strap 104 to arm cover 102 for holding arm cover 102 in a position over each cantilevered armrest 10.

Although the invention has been described in detail with reference to certain preferred embodiments, variations and modifications exist within the scope and spirit of the invention as described and defined in the following claims.

The invention claimed is:

1. A juvenile vehicle seat assembly comprising
a seat including a seat bottom and a seat back,
a cantilevered armrest projecting from the seat back, the cantilevered armrest including an arm and a support mount appended to the arm and coupled to the seat back to support the arm in a cantilevered position,
a first fastener coupled to the support mount and the seat back to maintain the arm in the cantilevered position, the first fastener being arranged to lie above the arm to cause the arm to lie between the first fastener and the seat bottom,
wherein the support mount includes an inner flange coupled to the arm and an outer flange coupled to the arm and positioned to lie in spaced-apart relation to the inner flange to receive a ridge of the seat back in a U-shaped channel formed in the support mount between the inner and outer flanges and wherein the first fastener extends through the inner and outer flanges, and
wherein each flange is formed to include a lower wing extending below the arm and toward the seat bottom and the second fastener is coupled to the lower wing of each flange.

2. The assembly of claim 1, wherein the first fastener has a first length and the second fastener has a second length longer than the first length.

3. The assembly of claim 1, wherein each fastener includes a barrel having a first end and an opposite threaded opened end, an enlarged head coupled to the first end, and a screw threaded to fit in and mate with the threaded opened end of the barrel to couple the support mount to the seat back.

4. The assembly of claim 1, wherein each flange is formed to include an upper wing rising above the arm and away from the seat bottom and the first fastener is coupled to the upper wing of each flange.

5. The assembly of claim 4, wherein the ridge of the seat back received in the U-shaped channel is formed to include a fastener aperture, each upper wing is formed to include a fastener aperture, and the first fastener is arranged to extend through the fastener apertures formed in the ridge of the seat back and each upper wing.

6. A juvenile vehicle seat assembly comprising
a seat including a seat bottom and a seat back,
a cantilevered armrest projecting from the seat back, the cantilevered armrest including an arm having a free end, a top surface and a support mount appended to the arm and coupled to the seat back to support the arm in a cantilevered position,
a first fastener coupled to the support mount and the seat back to maintain the arm in the cantilevered position, the first fastener being arranged to lie above the top surface of the arm to cause the arm to lie between the first fastener and the seat bottom when the arm is in the cantilevered position, and wherein the cantilevered armrest further includes a load support panel fixed to the cantilevered armrest to lie in a fixed position relative to the arm and the support mount and to engage a ridge of the seat back to block pivotable movement of the cantilevered armrest toward the seat bottom about a pivot axis established by the first fastener, and
wherein the support mount includes an inner flange coupled to the arm and an outer flange coupled to the arm and positioned to lie in spaced-apart relation to the inner flange to receive a ridge of the seat back in a U-shaped channel formed in the support mount between the inner and outer flanges and the load support panel includes a lower edge positioned to engage the ridge of the seat back and lie in a position between the inner and outer flanges of the support mount.

7. A juvenile vehicle seat assembly comprising
a seat including a seat bottom and a seat back having a side ridge facing forwardly toward the seat bottom,
a cantilevered armrest including a rearwardly facing support mount, an arm having a free end and a top surface, the support mount being appended to the arm and extending above the top surface of the arm for receiving the forwardly facing side ridge of the seat back therein, and a generally flat load support panel arranged so that only an end of the generally flat load support panel abuts the seat back to block pivotable movement of the cantilevered arm relative to the seat back, and
a retainer coupled to a portion of the support mount and the seat back to maintain the arm in a cantilevered position.

8. The assembly of claim 7, wherein the load support panel is arranged to lie in a fixed position relative to the arm and the support mount and to abut the forwardly facing side ridge of the seat back to block pivotable movement of the cantilevered armrest toward the seat bottom about a pivot axis established by a first fastener of the retainer.

9. The assembly of claim 7,
wherein the support mount includes an inner flange and an outer flange positioned to lie in a spaced-apart relation to the inner flange and both inner and outer flanges are positioned to lie against the side ridge.

10. The assembly of claim 9, wherein the side ridge of the seat back further includes inner and outer panels and the inner and outer flanges have upper wings, one upper wing is positioned to lie against a portion of the inner panel above the arm, and another upper wing is positioned to lie against a portion of the outer panel above the arm.

11. The assembly of claim 10, wherein the retainer includes a first fastener and a second fastener, and the first fastener couples the upper wings to the inner panel and the outer panel of the side ridge at the position above the arm.

12. The assembly of claim 9, wherein the inner and outer flanges includes lower wings, one lower wing is positioned to lie against a portion of the inner panel below the arm, and another lower wing is positioned to lie against the outer panel below the arm.

13. The assembly of claim 9, wherein the retainer includes a first fastener which couples the support mount to the seat back above the arm.

14. The assembly of claim 9, wherein the retainer includes a second fastener which couples the support mount to the seat back below the arm.

15. The assembly of claim 7,
wherein the support mount is formed to include a U-shaped channel which is positioned to lie above the arm.

16. The assembly of claim 15, wherein the U-shaped channel mates with the side edge above the arm.

17. A juvenile vehicle seat assembly comprising
a seat including a seat bottom and a seat back having a side edge facing forwardly toward the seat bottom,
a cantilevered armrest including a free end, a top surface and a support mount formed to include a rearwardly facing U-shaped channel receiving the forwardly facing side edge of the seat back therein and an arm appended to the support mount, and
means for fastening the support mount to the seat back above and below the arm and on a side of the side edge to support the arm in a cantilevered position to stabilize the arm against movement, and
wherein the cantilevered armrest further includes a load support panel arranged to lie in a fixed position relative to the arm and the support mount and to abut the forwardly facing side edge of the seat back to block pivotable movement of the cantilevered armrest toward the seat bottom about a pivot axis established by the first fastener.

18. A juvenile vehicle seat assembly comprising
a seat including a seat bottom and a seat back,
a non-pivotable cantilevered armrest including an arm having a free end, a top surface and a support mount appended to the arm, the support mount including upper wings rising above the top surface of the arm and away from the seat bottom and lower wings extending below the top surface of the arm and toward the seat bottom, and
a first fastener coupled to the upper wings and the seat back and a second fastener coupled to the lower wings and the seat back, and
wherein each lower wing is formed to include a fastener aperture, the seat back is formed to include a second fastener aperture, and the second fastener is arranged to extend through the fastener aperture formed in the lower wings and the second fastener aperture formed in the seat back.

19. The assembly of claim 18, wherein each upper wing is formed to include a fastener aperture, the seat back is formed to include a fastener aperture, and the first fastener is arranged to extend through fastener apertures formed in the upper wings and seat back.

20. The assembly of claim 18, wherein each fastener includes a barrel having a first end and an opposite threaded opened end, an enlarged head coupled to the first end, and a screw threaded to fit in and mate with the threaded opened end of the barrel to couple the support mount to the seat back.

21. The assembly of claim 18, wherein the first fastener has a first length and the second fastener has a second length longer than the first length.

* * * * *